(12) United States Patent
Zhang et al.

(10) Patent No.: US 12,363,423 B2
(45) Date of Patent: Jul. 15, 2025

(54) MEDIA CONTENT CAPTURING METHOD AND APPARATUS, DEVICE, STORAGE MEDIUM, AND PROGRAM PRODUCT

(71) Applicant: Beijing Zitiao Network Technology Co., Ltd., Beijing (CN)

(72) Inventors: Zeqian Zhang, Beijing (CN); Zhenan Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/759,752

(22) Filed: Jun. 28, 2024

(65) Prior Publication Data
US 2024/0357229 A1   Oct. 24, 2024

Related U.S. Application Data

(63) Continuation of application No. PCT/CN2023/091784, filed on Apr. 28, 2023.

(30) Foreign Application Priority Data

May 12, 2022   (CN) .......................... 202210519438.5

(51) Int. Cl.
*H04N 23/63*   (2023.01)
*H04N 23/62*   (2023.01)

(52) U.S. Cl.
CPC ........... *H04N 23/632* (2023.01); *H04N 23/62* (2023.01)

(58) Field of Classification Search
CPC ...... H04N 23/632; H04N 23/64; H04N 23/62; H04N 1/00973; H04N 1/00183; H04N 1/00132; H04N 2101/00
See application file for complete search history.

(56) References Cited

U.S. PATENT DOCUMENTS

| 8,810,691 B2 * | 8/2014 | Ito ........................ H04N 23/631 |
| | | 348/333.02 |
| 8,917,326 B2 * | 12/2014 | Gotoh .................... H04N 23/64 |
| | | 348/207.1 |

(Continued)

FOREIGN PATENT DOCUMENTS

| CN | 106294831 A | 1/2017 |
| CN | 110012352 A | 7/2019 |

(Continued)

OTHER PUBLICATIONS

International Search Report and Written Opinion received for PCT/CN2023/091784, mailed Aug. 3, 2023, 14 pages.

(Continued)

*Primary Examiner* — Pritham D Prabhakher
(74) *Attorney, Agent, or Firm* — Astute IP Law Group

(57) ABSTRACT

The embodiment of the disclosure discloses a media content capturing method and apparatus, a device, a storage medium, and a program product. The method includes: displaying a capture page, in response to a page display operation for the capture page, and displaying prompt information associated with a first media content on the capture page; wherein, the first media content is a media content having had a preset feedback operation executed by a user; the prompt information is used for displaying a target preview picture of a target effect; and the target effect is a capture effect adopted in the first media content; and adopting the target effect to capture a second media content, in response to a trigger operation of adopting the target effect for capture.

20 Claims, 7 Drawing Sheets

(56) References Cited

U.S. PATENT DOCUMENTS

| | | | |
|---|---|---|---|
| 11,200,278 B2* | 12/2021 | Song | G06F 16/7834 |
| 11,206,448 B2* | 12/2021 | Song | H04N 21/4334 |
| 11,671,696 B2* | 6/2023 | Paul | G06F 3/03547 |
| | | | 348/333.01 |
| 2009/0115855 A1 | 5/2009 | Gotoh et al. | |
| 2011/0199322 A1* | 8/2011 | Langlois | G06F 3/04883 |
| | | | 345/173 |
| 2012/0057051 A1 | 3/2012 | Ito et al. | |
| 2013/0031220 A1* | 1/2013 | Moncavage | H04N 21/8113 |
| | | | 709/219 |
| 2013/0070093 A1* | 3/2013 | Rivera | H04N 21/4302 |
| | | | 348/143 |
| 2014/0267796 A1* | 9/2014 | Jang | H04N 23/61 |
| | | | 348/207.1 |
| 2015/0156552 A1* | 6/2015 | Wayans | H04N 5/772 |
| | | | 386/230 |
| 2015/0346959 A1* | 12/2015 | Ruben | G06F 3/04842 |
| | | | 715/738 |
| 2016/0336039 A1* | 11/2016 | Leiberman | G11B 27/28 |
| 2017/0249971 A1* | 8/2017 | Chong | G11B 27/036 |
| 2018/0005618 A1* | 1/2018 | Liu | G06F 16/00 |
| 2019/0025999 A1* | 1/2019 | Murphy | G06F 3/0482 |
| 2020/0358963 A1* | 11/2020 | Manzari | H04N 23/633 |
| 2021/0026886 A1* | 1/2021 | Song | G06F 16/7867 |
| 2021/0195284 A1* | 6/2021 | Song | H04N 21/4722 |
| 2022/0294992 A1* | 9/2022 | Manzari | H04N 23/632 |
| 2022/0334693 A1* | 10/2022 | De Vries | G06F 3/04842 |
| 2022/0335697 A1* | 10/2022 | Harding | G06T 15/00 |
| 2023/0319232 A1* | 10/2023 | Sethia | G06V 20/41 |
| | | | 386/314 |

FOREIGN PATENT DOCUMENTS

| | | |
|---|---|---|
| CN | 110913135 A | 3/2020 |
| CN | 111586329 A | 8/2020 |
| CN | 111629247 A | 9/2020 |
| CN | 112135059 A | 12/2020 |
| CN | 112351203 A | 2/2021 |
| CN | 112422804 A | 2/2021 |
| CN | 113115099 A | 7/2021 |
| CN | 114938427 A | 8/2022 |
| CN | 114938427 B | 3/2024 |
| WO | 2018/228168 A1 | 12/2018 |
| WO | 2022/088877 A1 | 5/2022 |

OTHER PUBLICATIONS

Notice of Allowance for Chinese Patent Application No. 202210519438.5, mailed Feb. 9, 2024, 7 pages.

Office Action for Chinese Patent Application No. 202210519438.5, mailed Sep. 18, 2023, 15 pages.

* cited by examiner

MEDIA CONTENT CAPTURING METHOD AND APPARATUS, DEVICE, STORAGE MEDIUM, AND PROGRAM PRODUCT

CROSS-REFERENCE TO RELATED APPLICATIONS

The present application is a continuation of International Patent Application No. PCT/CN2023/091784, filed on Apr. 28, 2023, which claims priority of Chinese Patent Application No. 202210519438.5 filed on May 12, 2022, and the entire content disclosed by the Chinese patent application is incorporated herein by reference as part of the present application.

TECHNICAL FIELD

Embodiments of the present disclosure relate to a field of computer technology, for example, a media content capturing method and apparatus, a device, a storage medium, and a program product.

BACKGROUND

In the related technologies, a user may add a video to favorites, or, select the user's favorite effect for capture by browsing an effect panel, after entering a capture page.

SUMMARY

The embodiments of the present disclosure provide a media content capturing method and apparatus, a device, a storage medium, and a program product, to simplify the operation of using an effect in a video added to favorites for capture.

The embodiment of the present disclosure provides a media content capturing method, which comprises:
  displaying a capture page, in response to a page display operation for the capture page, and displaying prompt information associated with a first media content on the capture page; wherein, the first media content is a media content having had a preset feedback operation executed by a user; the prompt information is used for displaying a target preview picture of a target effect; and the target effect is a capture effect adopted in the first media content; and
  adopting the target effect to capture a second media content, in response to a trigger operation of adopting the target effect for capture.

The embodiment of the present disclosure further provides a media content capturing apparatus, which comprises:
  a page display module, configured to display a capture page, in response to a page display operation for the capture page, and display prompt information associated with a first media content on the capture page; wherein, the first media content is a media content having had a preset feedback operation executed by a user; the prompt information is used for displaying a target preview picture of a target effect; and the target effect is a capture effect adopted in the first media content; and
  a capturing module, configured to adopt the target effect to capture a second media content, in response to a trigger operation of adopting the target effect for capture.

The embodiment of the present disclosure further provides an electronic device, which comprises:
  at least one processor; and
  a memory, in communicative connection with the at least one processor; wherein, the memory stores a computer program executable by the at least one processor; the computer program is executed by the at least one processor, so that the at least one processor is capable of executing the media content capturing method according to the embodiment of the present disclosure.

The embodiment of the present disclosure further provides a computer readable storage medium, having computer instructions stored thereon, wherein, the computer instructions, when executed by a processor, implement the media content capturing method according to the embodiment of the present disclosure.

The embodiment of the present disclosure further provides a computer program product, comprising a computer program, wherein, the computer program, when executed by a processor, implements the media content capturing method according to the embodiment of the present disclosure.

BRIEF DESCRIPTION OF DRAWINGS

In the all drawings, same or similar drawing reference signs represent same or similar elements. It should be understood that the drawings are schematic, and originals and elements may not necessarily be drawn to scale.

DETAILED DESCRIPTION

Figure 1:
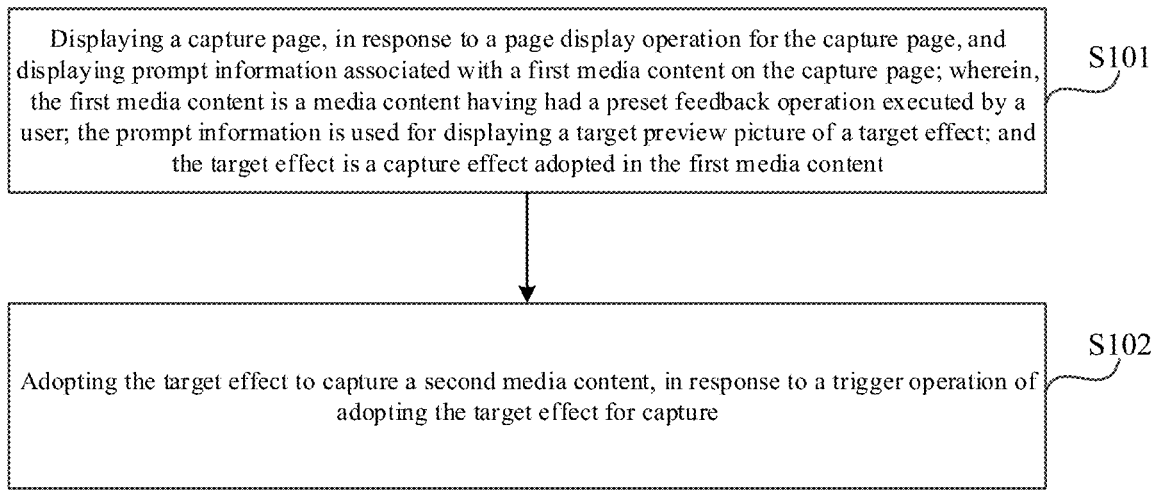
FIG. 1 is a schematic flow chart of a media content capturing method provided by an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

Names of messages or information interacted between a plurality of apparatuses according to the implementations of the present disclosure are only used for illustrative purposes, and are not used to limit the scope of these messages or information.

It may be understood that before using the technical solutions disclosed in the respective embodiments of the present disclosure, a user should be informed of type, usage scope, usage scenarios, etc. of personal information involved in the present disclosure and authorization from the user should be acquired according to relevant laws and regulations in an appropriate manner.

For example, in response to receiving an active request of a user, prompt information is sent to the user to clearly prompt the user that the operation to be executed as requested by the user will require acquiring and using personal information of the user. Thus, according to the prompt information, the user may autonomously choose whether to provide personal information to software or hardware such as an electronic device, an application, a server, or a storage medium that executes the operation of the technical solution of the present disclosure.

As an optional but non-restrictive implementation, in response to receiving an active request of a user, prompt information may be sent to the user, for example, through a pop-up window, and the prompt information may be presented in text in the pop-up window. In addition, the pop-up window may also carry a selection control for the user to choose whether to "agree" or "disagree" to provide personal information to an electronic device.

It may be understood that the above-described processes of informing and acquiring user authorization are only illustrative and do not constitute a limitation on the implementation of the present disclosure; other modes that meet relevant laws and regulations may also be applied to the implementation of the present disclosure.

In the related technologies, the operation of using an effect in a video added to favorites for capture is relatively cumbersome, so that the user has to spend a long time.

FIG. 1 is a schematic flow chart of a media content capturing method provided by an embodiment of the present disclosure. The method may be executed by a media content capturing apparatus, wherein the apparatus may be implemented by software and/or hardware, and may be configured in an electronic device, for example, may be configured in a mobile phone or a tablet personal computer. The media content capturing method provided by the embodiment of the present disclosure is applicable to a scenario of capture by adopting a capture effect adopted in a media content having had a preset feedback operation executed, for example, a scenario of capture by adopting a capture effect adopted in a video having been added to favorites. As shown in FIG. 1, the media content capturing method provided by this embodiment may include:

S101: displaying a capture page, in response to a page display operation for the capture page, and displaying prompt information associated with a first media content on the capture page; wherein, the first media content is a media content having had a preset feedback operation executed by a user; the prompt information is used for displaying a target preview picture of a target effect; and the target effect is a capture effect adopted in the first media content.

The page display operation for the capture page may be understood as a trigger operation of displaying the capture page; exemplarily, the page display operation may be a trigger operation of switching to enter the capture page from other page (e.g., a media content exhibition page); or, when the capture page is a homepage of the application software, the page display operation may also be a trigger operation of launching the application software.

The first media content may be a media content having had a capture effect adopted during capture and having had a preset feedback operation executed by the user. The media content may be, for example, a video or a picture. The preset feedback operation may include a favorite addition operation, a like operation, a comment operation, or a share operation, etc.; and correspondingly, the first media content may be a media content having been added to favorites, liked, commented on, or forwarded by the user.

In this embodiment, the first media content may be any media content having had a capture effect adopted during capture and having had a preset feedback operation executed by the user; exemplarily, the first media content may be a media content having had a capture effect adopted during capture and meeting a set condition, among the media contents having had a preset feedback operation executed by the user, so as to avoid frequent display of prompt information that may interrupt the user. The preset condition may be set as needed, for example, the preset condition may be set to a media content having had a preset feedback operation executed by the user within the last n (n>0) days and having not yet had an effect adopted in the media content previewed on the capture page (i.e., having not yet had a preview picture of the effect adopted in the media content viewed on the capture page). Taking the preset feedback operation as a favorite addition operation, the first media content may be a media content having had a capture effect adopted during capture but having not yet had the capture effect previewed by the user on the capture page, among the media contents having been added to favorites by the user within the last n (n>0) days.

The target effect may be understood as a capture effect (e.g., a capture prop) adopted in the first media content, that is, the capture effect adopted when capturing the first media content. Correspondingly, the target preview picture may be understood as a preview picture of the target effect, which may be a picture obtained through processing an original preview picture captured by a camera in real time by adopting the target effect.

Figure 2:
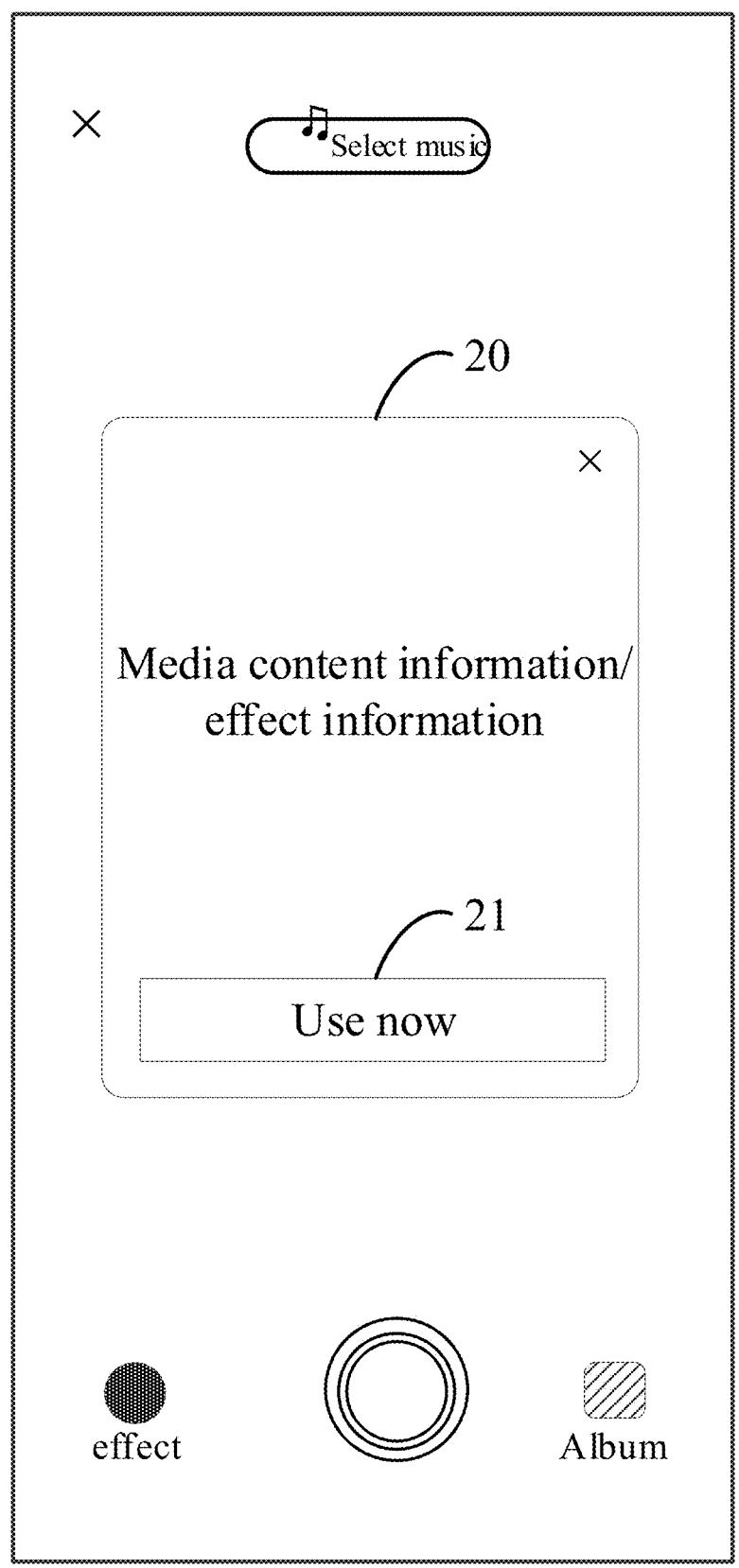
FIG. 2 is a schematic diagram of display of prompt information provided by an embodiment of the present disclosure.

When receiving the page display operation for the capture page, it may be judged whether there is a first media content that needs to have prompt information associated therewith displayed; if there is a first media content that needs to have prompt information associated therewith displayed, the capture page will be displayed, and the prompt information associated with the first media content is displayed on the capture page, as shown in FIG. 2 (taking that the prompt information includes media content information of the first media content and/or effect information of the target effect as an example in FIG. 2), for example, the target preview picture of the target effect is directly displayed, or, display of the target preview picture of the target effect is triggered through the prompt information, to facilitate the user to view the target preview picture of the target effect adopted in the first media content; if there is no first media content that needs to have prompt information associated therewith displayed, the capture page is displayed without displaying the prompt information associated with the first media content.

Taking the media content as a video, the preset feedback operation as a favorite addition operation, and n=2, when judging whether there is a first media content that needs to have prompt information associated therewith displayed, it may be judged whether the user has added a video captured by adopting a capture effect to favorites within the last two days; if the user has added a video captured by adopting a capture effect to favorites within the last two days, it may be judged whether there is a video having not yet had a capture effect adopted in the video previewed by the user on the capture page, among videos having been captured by adopting a capture effect and added to favorites by the user within the last two days; if there is, the determined video having not yet had a capture effect adopted in the video previewed by the user on the capture page will be taken as the first media content, and it is determined that there is a first media content that needs to have prompt information associated therewith displayed. Correspondingly, if there is no video having not yet had a capture effect adopted in the video previewed by the user on the capture page, or, if it is determined that no video captured by adopting a capture effect has been added to favorites by the user within the last two days, it is determined that there is no first media content that needs to have prompt information associated therewith displayed.

The first media content having had a preset feedback operation executed by the user is determined through appropriate means in accordance with relevant laws and regulations, with the user's authorized consent; and the first media content is determined to be only used for exhibiting the prompt information associated with the first media content to the user when the user switches to enter the capture page, and not for purposes unassociated with the embodiments of the present disclosure. Taking the preset feedback operation as a favorite addition operation, the prompt information associated with the first media content in media content favorites may be displayed on the capture page of the user, to prompt the user to adopt the capture effect in the first media content added thereby to favorites for capture, only in a case where the user sets his/her media content favorites to public (i.e., the media content favorites of the user are visible to all users).

In this embodiment, when the user enters the capture page, the prompt information associated with the first media content having had a preset feedback operation executed by the user is displayed on the capture page; so that the user may quickly view the target preview picture of the target effect adopted in the first media content through the prompt information without triggering an effect panel control to enter the effect panel so as to search for the target effect and trigger the target effect to view the target preview picture, which may simplify the operations required for the user to preview a capture effect of the target effect adopted thereby in the first media content having had a preset feedback operation executed (e.g., having been added to favorites), and further simplify the operations required for the user to adopt the target effect for capture, so as to improve user experience. In addition, the prompt information is displayed on the capture page, and the prompt information is used to prompt the user to adopt the target effect in the first media content having had a preset feedback operation executed thereby for capture, which may diminish cases where the user forgets to adopt the effect in the media content for capture after adding the media content to favorites, so as to improve enthusiasm of the user in capturing and submitting works In this embodiment, when there is only one first media content that meets the set condition, the prompt information associated with the first media content may be directly displayed on the capture page. When there are a plurality of first media contents that meet the set condition, prompt information associated with at least two first media contents that meet the condition may be displayed on the capture page; or, prompt information associated with one first media content that meets the condition may be displayed on the capture page, for example, prompt information associated with a first media content having had a preset feedback operation executed recently by the user or prompt information associated with the most popular first media content may be displayed, and the prompt information displayed on the capture page may be switched based on a switch operation of the user. Optionally, after the displaying the prompt information associated with the first media content on the capture page, the method further includes: switching the prompt information displayed on the capture page, in response to the switch operation, wherein, different prompt information is associated with different first media contents.

Figure 3:
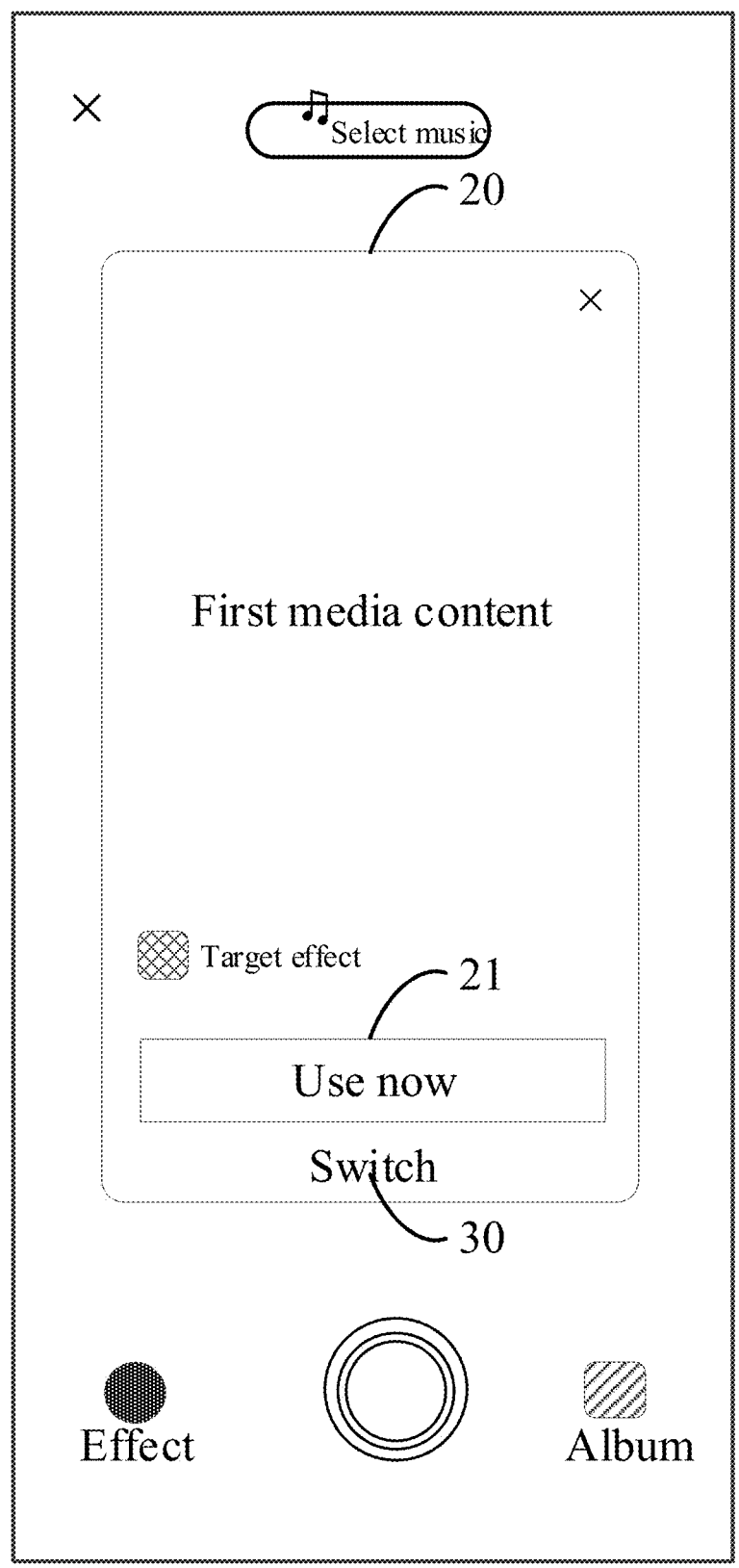
FIG. 3 is a schematic diagram of display of another type of prompt information provided by an embodiment of the present disclosure.

Exemplarily, as shown in FIG. 3 (taking that the prompt information includes a content of the first media content as an example), when there are a plurality of first media contents that meet the set condition, prompt information associated with one first media content may be displayed on the capture page, and a switch control 30 may be displayed; so that the user may trigger the switch control 30 when he/she wants to view prompt information associated with other first media content. Correspondingly, when detecting a user triggering the switch control 30, the electronic device may confirm receipt of the switch operation and switch the prompt information associated with the current first media content (e.g., first media content A) currently displayed on the capture page to prompt information associated with other first media content (e.g., first media content B), in response to the switch operation, to facilitate the user to view prompt information associated with different first media contents, to further quickly determine whether to adopt a capture effect adopted in one first media content for capture.

S102: adopting the target effect to capture a second media content, in response to a trigger operation of adopting the target effect for capture.

The trigger operation of adopting the target effect for capture may be understood as a trigger operation of adopting the target effect to capture a new media content; for example, when the target preview picture of the target effect is displayed on the capture page, an operation of a capture control on the capture page is triggered. The second media content may be the new media content captured by the user through the trigger operation, for example, a new video or a new picture, etc.

Figure 4:
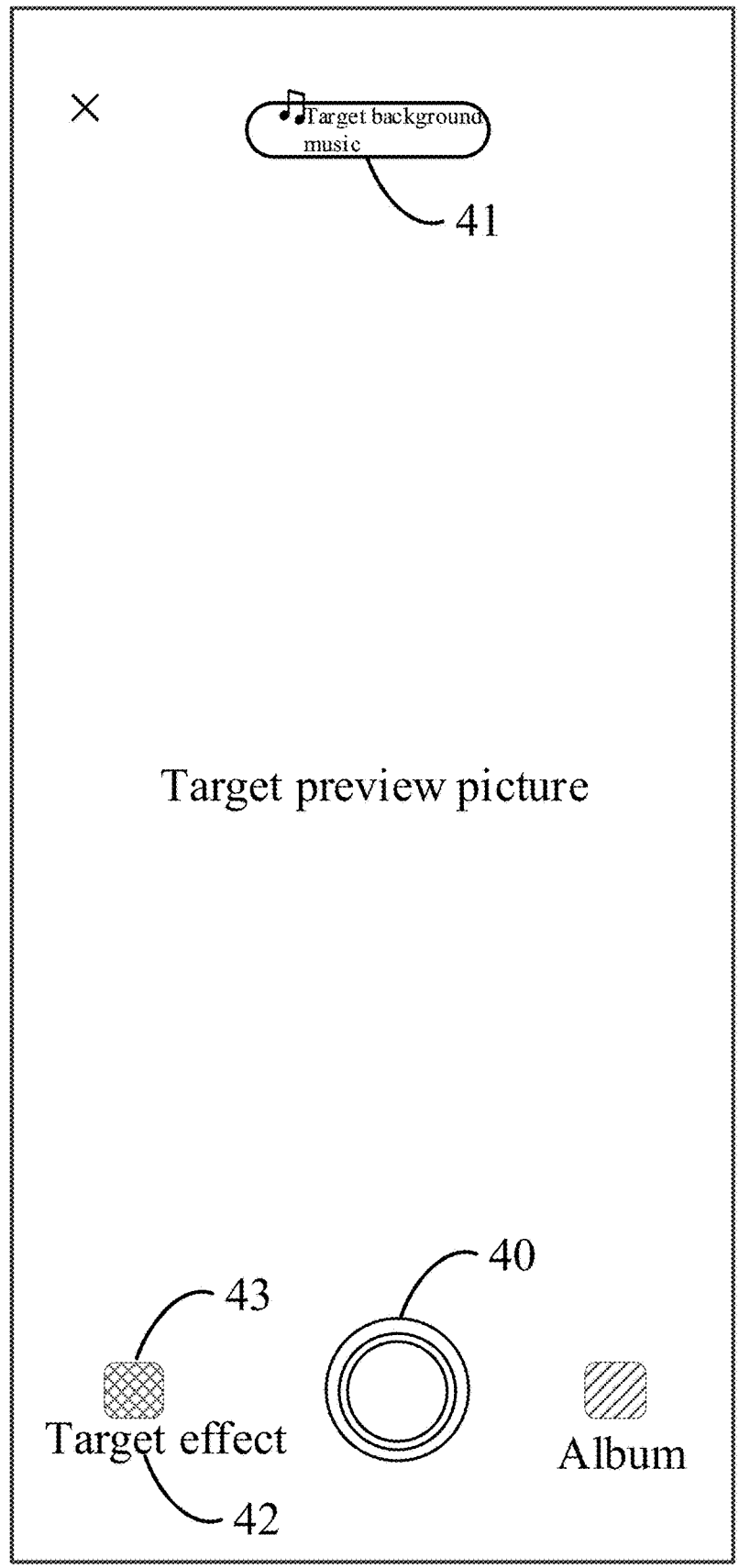
FIG. 4 is a schematic diagram of display of a capture page provided by an embodiment of the present disclosure.

Exemplarily, the electronic device may display the target preview picture of the target effect on the capture page automatically or based on the trigger operation of the user for the prompt information, as shown in FIG. 4. When the user wants to adopt the target effect for capture, he/she may trigger a capture control 40 displayed on the capture page. Correspondingly, when detecting a user triggering the capture control 40, the electronic device may adopt the target effect for capture, to obtain the second media content.

In this embodiment, when the user executes a preset feedback operation for a media content captured by adopting a capture effect, he/she may add or not add the capture effect adopted in the media content to favorites, which will not be limited in this embodiment.

In one implementation, with respect to the case where the preset feedback operation is a favorite addition operation, when the user adds a media content captured by adopting a capture effect to favorites, he/she may only add the media content to favorites without adding the capture effect adopted in the media content to favorites; or he/she may also add the media content and the capture effect adopted in the media content to favorites, to avoid a case where the user has to execute another favorite addition operation for the capture effect (e.g., switch to a details page of the capture effect and trigger a favorite addition control on the details page) so as to add the capture effect adopted in the media content to favorites, which simplifies operations required for the user to add the media content and the capture effect adopted in the media content to favorites. Optionally, the preset feedback operation includes a favorite addition operation. The media content capturing method provided by this embodiment further includes: adding the first media content to favorites in response to a favorite addition operation for the first media content, or, adding the first media content and the target effect to favorites. Wherein, when adding a media content (e.g., the first media content) to favorites, the media content may be added to the media content favorites of the user; and when adding a capture effect (e.g., the target effect) to favorites, the capture effect may be added to an effect favorites list of the user.

The media content capturing method provided by this embodiment includes: displaying the capture page, in response to the page display operation for the capture page, and displaying the prompt information associated with the first media content on the capture page; wherein, the first media content is a media content having had a preset feedback operation executed by the user; the prompt information is used for displaying the target preview picture of the target effect; and the target effect is the capture effect adopted in the first media content; and adopting the target effect to capture the second media content, in response to the trigger operation of adopting the target effect for capture. In this embodiment, by adopting the above-described technical solution, the prompt information of the preview picture for displaying the capture effect adopted in the media content having had a preset feedback operation executed by the user is exhibited on the capture page, which may simplify the operations required when the user previews the capture effect of the capture effect adopted in the media content having had a preset feedback operation executed thereby, and further simplify the operations required for the user to adopt the capture effect for capture, so as to improve user experience.

Figure 5:
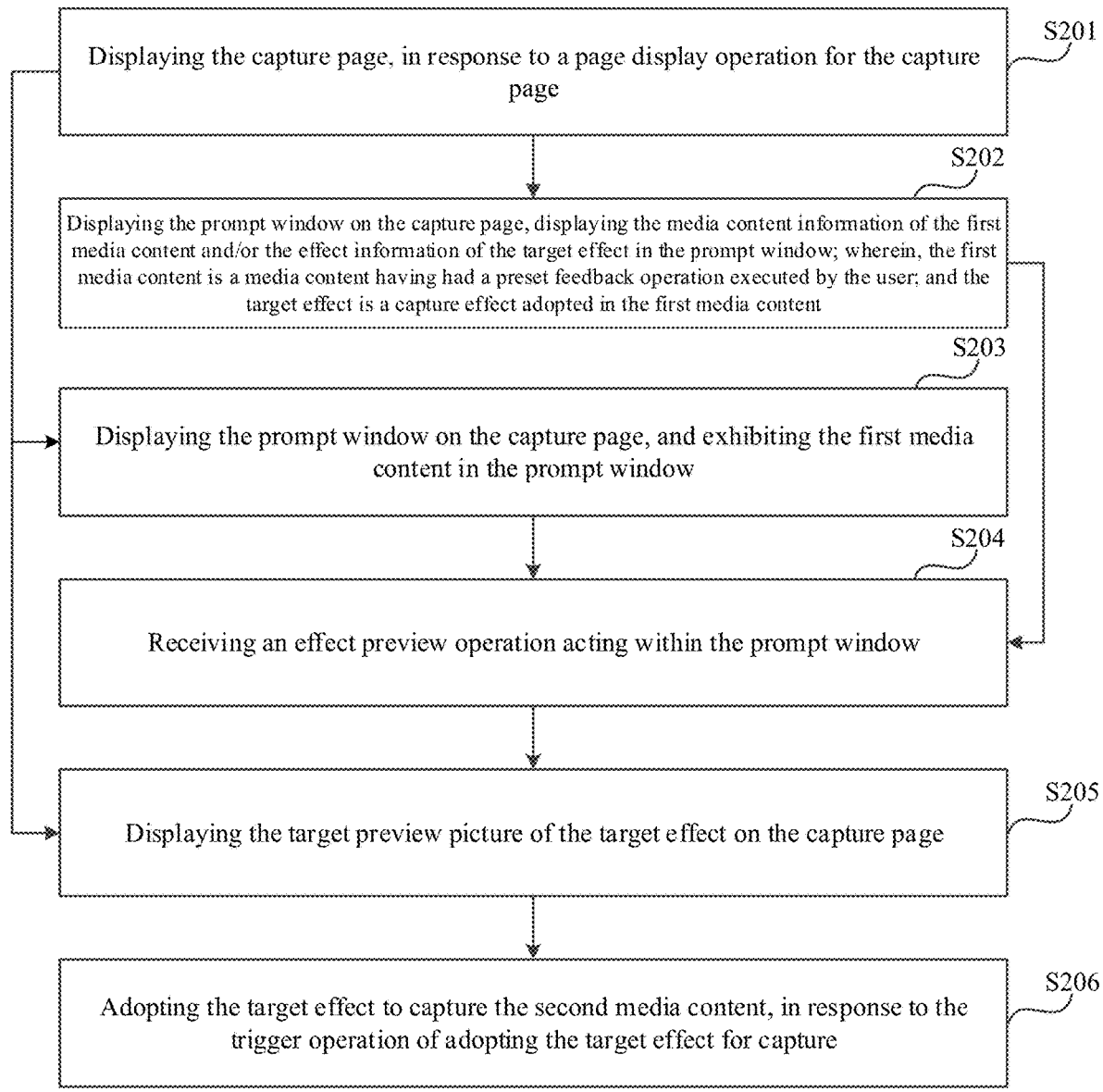
FIG. 5 is a schematic flow chart of another media content capturing method provided by an embodiment of the present disclosure.

FIG. 5 is a schematic flow chart of another media content capturing method provided by an embodiment of the present disclosure. The solution in this embodiment may be combined with one or more optional technical solutions in the above-described embodiments. Optionally, the displaying prompt information associated with a first media content on the capture page, includes: displaying a prompt window on the capture page, and displaying media content information of the first media content and/or effect information of a target effect in the prompt window; or, displaying a prompt window on the capture page, and exhibiting the first media content in the prompt window.

Optionally, after the displaying prompt information associated with a first media content on the capture page, the method further includes: displaying a target preview picture of the target effect on the capture page, in response to an effect preview operation acting within the prompt window.

Optionally, the displaying prompt information associated with a first media content on the capture page, includes: displaying the target preview picture of the target effect on the capture page.

As shown in FIG. 5, the media content capturing method provided by this embodiment may include:

S201: displaying the capture page, in response to a page display operation for the capture page, and executing S202, S203, or S205.

S202: displaying the prompt window on the capture page, displaying the media content information of the first media content and/or the effect information of the target effect in the prompt window, and executing S204; wherein, the first media content is a media content having had a preset feedback operation executed by the user; and the target effect is a capture effect adopted in the first media content.

In this embodiment, the prompt information may include video information of the first media content and/or the effect information of the target effect adopted in the first media content, that is, the user may be prompted to adopt the target effect adopted in the first media content for capture through displaying the media content information of the first media content and/or the effect information of the target effect adopted in the first media content.

The media content information of the first media content may include, for example, cover and/or name of the first media content. The effect information of the target effect may include, for example, effect icon and/or effect name of the target effect.

Exemplarily, when receiving a page display operation for the capture page, the electronic device may display the capture page, display a prompt window 20 on the capture page, and display the media content information of the first media content and/or the effect information of the target effect in the prompt window 20, as shown in FIG. 2.

S203: displaying the prompt window on the capture page, and exhibiting the first media content in the prompt window.

In this embodiment, the prompt information may further include a content of the first media content, that is, may prompt the user to adopt the target effect adopted in the first media content for capture through displaying the first media content.

Exemplarily, when receiving a page display operation for the capture page, the electronic device may display the capture page, display the prompt window 20 on the capture page, and exhibit the first media content in the prompt window 20, as shown in FIG. 3, for example, may play the first media content in the prompt window 20 to exhibit the target effect adopted in the first media content to the user, when the first media content is a video.

In an optional implementation, when there is only one first media content that meets the set condition, the media content information of the first media content and the effect information of the target effect adopted in the first media content may be displayed in the prompt window 20; when there are a plurality of first media contents that meet the set condition, the first media contents and a switch control may be exhibited in the prompt window 20, to facilitate the user to intuitively view capture effects of capture effects adopted in different first media contents through the first media contents exhibited in the prompt window 20.

S204: receiving an effect preview operation acting within the prompt window.

The effect preview operation may be understood as an operation of viewing the target preview picture of the target effect, that is, an operation of previewing the capture effect of the target effect, for example, an operation of triggering a preview control displayed in the prompt window 20.

In this embodiment, when the electronic device does not directly display the target preview picture of the target effect adopted in the first media content on the capture page, the user may view the target preview picture of the target effect by executing the effect preview operation within the prompt window 20.

Exemplarily, as shown in FIG. 2 and FIG. 3, when displaying the prompt window 20, the electronic device may display a preview control 21 in the prompt window 20, so that the user may trigger the preview control 21 when he/she wants to view the target preview picture of the target effect. Correspondingly, when detecting a user triggering the preview control 21, the electronic device confirms receipt of the effect preview operation, may cancel display of the prompt window 20 in response to the effect preview operation, and execute S205, to exhibit the capture effect of the target effect to the user.

S205: displaying the target preview picture of the target effect on the capture page.

Figure 6:
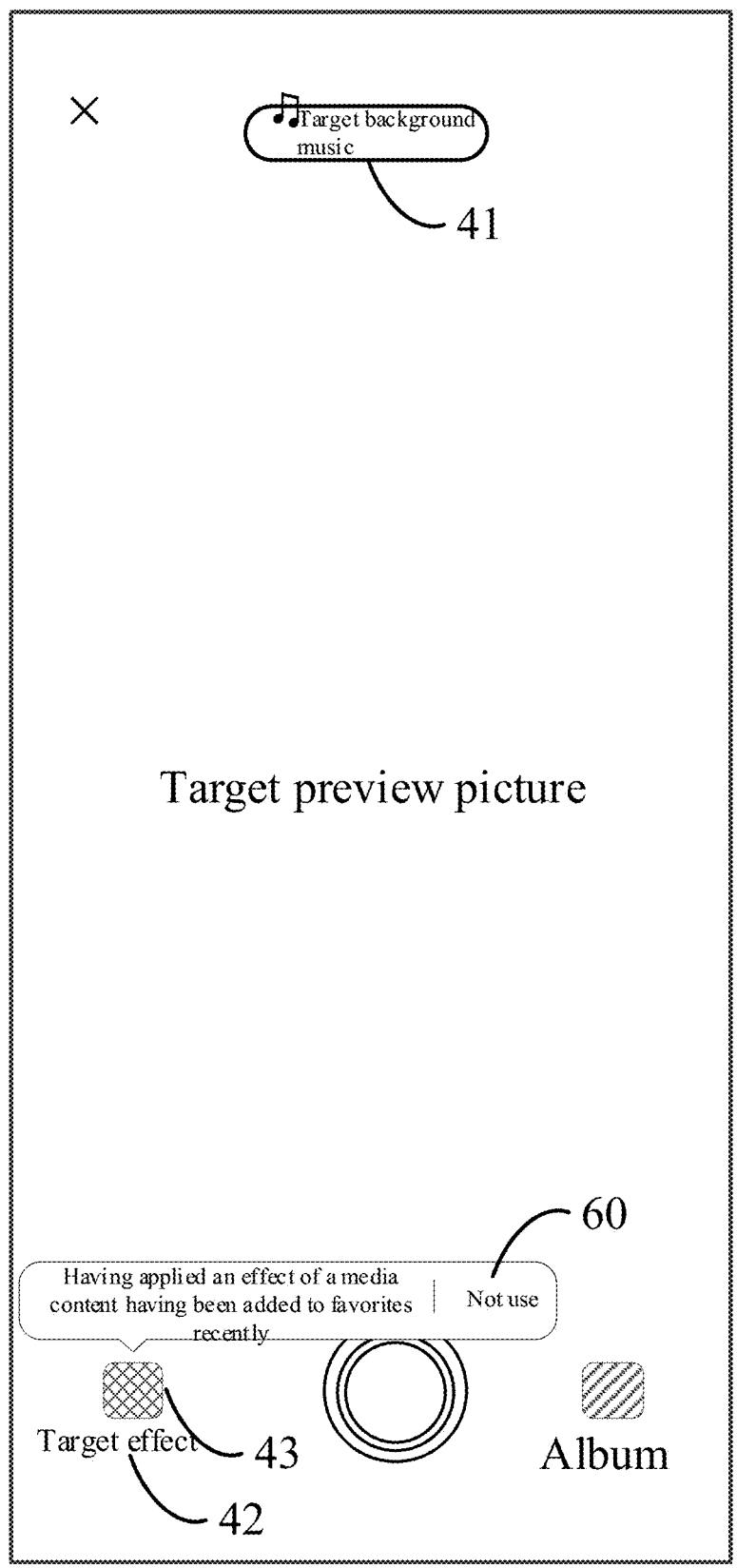
FIG. 6 is a schematic diagram of display of another type of prompt information provided by an embodiment of the present disclosure.

In this embodiment, when displaying the capture page in response to the page display operation, the electronic device may not directly display the target preview picture of the target effect adopted in the first media content on the capture page, but may display the target preview picture of the target effect on the capture page when receiving the effect preview operation of the user; or may also directly display the target preview picture of the target effect adopted in the first media content on the capture page, as shown in FIG. 6, to prompt the user to adopt the target effect adopted in the first media content for capture through displaying the target preview picture.

In one implementation, the displaying the target preview picture of the target effect on the capture page, includes: displaying the target preview picture of the target effect on the capture page; and adding target background music in the first media content as background music, and/or switching display of a control name of the effect panel control on the capture page to display of an effect name of the target effect, wherein, the effect panel control is used for triggering display of the effect panel.

In this embodiment, when displaying the target preview picture of the target effect adopted in the first media content, the background music (i.e., the target background music) adopted in the first media content may also be added as the background music of the target preview picture, and music information 41 of the target background music may be displayed on the capture page, as shown in FIG. 4 and FIG. 6, so that the user may capture the second media content with the target background music adopted in the first media content as the background music by executing the trigger operation of adopting the target effect for capture, without additionally selecting or adding background music.

In addition, with continued reference to FIG. 4 and FIG. 6, when displaying the target preview picture of the target effect adopted in the first media content, display of the control name of the effect panel control on the capture page may also be switched to display of an effect name 42 of the target effect, and display of a control icon of the effect panel control on the capture page may be switched to display of an effect icon 43 of the target effect, so that the user may quickly determine the currently exhibited target effect.

In this embodiment, only when displaying the target preview picture, display of the control name of the effect panel control is switched to display of the effect name of the target effect, and/or, display of the control icon of the effect panel control is switched to display of the effect icon of the target effect. However, the effect panel control actually is still the effect panel control, and the user may still instruct the electronic device to display the effect panel by triggering the effect panel control, to browse a plurality of capture effects (including the target effect) in the effect panel. Correspondingly, in such case, when detecting a user triggering the effect panel control, the electronic device may display the effect panel, and may position to the target effect, to facilitate the user to view the target effect or add the target effect to favorites.

In one implementation, after the displaying the target preview picture of the target effect on the capture page, the method further includes: canceling display of the target preview picture, in response to a preview cancel operation for the target effect.

The preview cancel operation may be understood as an operation of instructing the electronic device to cancel display of the target preview picture for the target effect, for example, an operation of triggering a preview cancel control displayed on the capture page.

In the above-described implementation, as shown in FIG. 6, when displaying the target preview picture of the target effect on the capture page in response to the page display operation and/or the effect preview operation for the capture page, the preview cancel control 60 may be displayed on the capture page, so that the user may trigger the preview cancel control 60 when he/she wants to cancel viewing of the target preview picture. Correspondingly, when detecting a user triggering the preview cancel control 60, the electronic device may confirm receipt of the preview cancel operation and switch the target preview picture displayed on the capture page to the original preview picture captured by the camera, in response to the preview cancel operation, and may cancel the target background music of the first media content added to the capture page, and/or, recover the control name of the effect panel control to the control name of the effect panel control per se, and recover the control icon of the effect panel control from the effect name of the target effect to the control icon of the effect panel control per se.

In addition, if there are a plurality of first media contents that meet the set condition, when displaying the capture page is in response to the page display operation and displaying the target preview picture of the target effect adopted in the first media content on the capture page, a switch control may also be displayed, so that the user may view preview pictures of capture effects adopted in different first media contents through triggering the switch control.

S206: adopting the target effect to capture the second media content, in response to the trigger operation of adopting the target effect for capture.

In the media content capturing method provided by this embodiment, when displaying the capture page, different ways are adopted to exhibit the preview effect of the capture effect adopted in the media content having had a preset feedback operation executed by the user, so that the user may quickly determine whether to adopt the capture effect adopted in the media content for capture, which further improves user experience.

Figure 7:
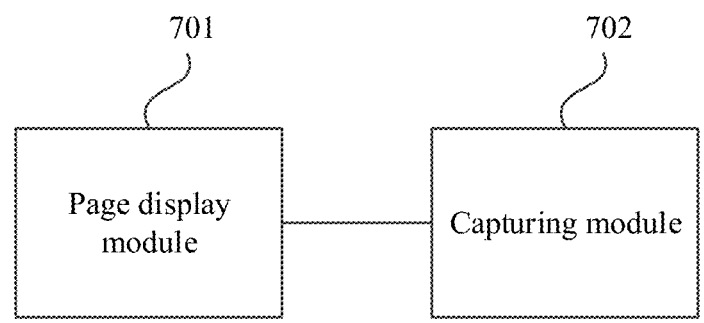
FIG. 7 is a structural block diagram of a media content capturing apparatus provided by an embodiment of the present disclosure.

FIG. 7 is a structural block diagram of a media content capturing apparatus provided by an embodiment of the present disclosure. The apparatus may be implemented by software and/or hardware, may be configured in an electronic device, for example, may be configured in a mobile phone or a tablet personal computer, and may execute the media content capturing method, to adopt the capture effect adopted in the media content having had a preset feedback operation executed by the user for capture. As shown in FIG. 7, the media content capturing apparatus provided by this embodiment may include: a page display module 701 and a capturing module 702, wherein, the page display module 701 is configured to display a capture page, in response to a page display operation for the capture page, and display prompt information associated with a first media content on the capture page; wherein, the first media content is a media content having had a preset feedback operation executed by a user; the prompt information is used for displaying a target preview picture of a target effect; and the target effect is a capture effect adopted in the first media content; and the capturing module 702 is configured to adopt the target effect to capture a second media content, in response to a trigger operation of adopting the target effect for capture.

In the media content capturing apparatus provided by this embodiment, the page display module displays the capture page, in response to the page display operation for the capture page, and display the prompt information associated with the first media content on the capture page; wherein, the first media content is a media content having had a preset feedback operation executed by the user; the prompt information is used for displaying the target preview picture of the target effect; and the target effect is a capture effect adopted in the first media content; and the capturing module adopts the target effect to capture a second media content, in response to the trigger operation of adopting the target effect for capture. In this embodiment, by adopting the above-described technical solution, the prompt information of the preview picture for displaying the capture effect adopted in the media content having had a preset feedback operation executed by the user is exhibited on the capture page, which may simplify the operations required when the user previews the capture effect of the capture effect adopted in the media content having had a preset feedback operation executed thereby, and further simplify the operations required for the user to adopt the capture effect for capture, so as to improve user experience.

In the above-described solution, the page display module 701 is configured to display prompt information associated with a first media content on the capture page in a mode of: displaying a prompt window on the capture page, and displaying media content information of the first media content and/or effect information of a target effect in the prompt window; or, displaying a prompt window on the capture page, and exhibiting the first media content in the prompt window.

The media content capturing apparatus provided by this embodiment may further include: an effect preview module, configured to display a target preview picture of the target effect on the capture page, in response to an effect preview operation acting within the prompt window, after the displaying prompt information associated with a first media content on the capture page.

In the above-described solution, the page display module 701 is configured to display prompt information associated with a first media content on the capture page in a mode of: displaying a target preview picture of the target effect on the capture page.

The media content capturing apparatus provided by this embodiment may further include: a preview cancel module, configured to cancel display of the target preview picture, in response to a preview cancel operation for the target effect, after the displaying a target preview picture of the target effect on the capture page.

In the above-described solution, the effect preview module is configured to display a target preview picture of the target effect on the capture page in a mode of: adding target background music in the first media content as background music, and/or switching display of a control name of the effect panel control on the capture page to display of an effect name of the target effect, wherein, the effect panel control is used for triggering display of the effect panel.

The media content capturing apparatus provided by this embodiment may further include: a switching module, configured to switch the prompt information displayed on the capture page, in response to a switch operation, after the displaying the prompt information associated with the first media content on the capture page, wherein, different prompt information is associated with different first media contents.

In the above-described solution, the preset feedback operation may include a favorite addition operation, and the media content capturing apparatus provided by this embodiment may further include: a favorite adding module, configured to add the first media content to favorites, in response to a favorite addition operation for the first media content, or, add the first media content and the target effect to favorites.

The media content capturing apparatus provided by the embodiment of the present disclosure may execute the media content capturing method provided by any one embodiment of the present disclosure, and has corresponding functional modules and effects for executing the media content capturing method. The media content capturing method provided by any one embodiment of the present disclosure may be referred to for technical details not described in this embodiment.

Figure 8:
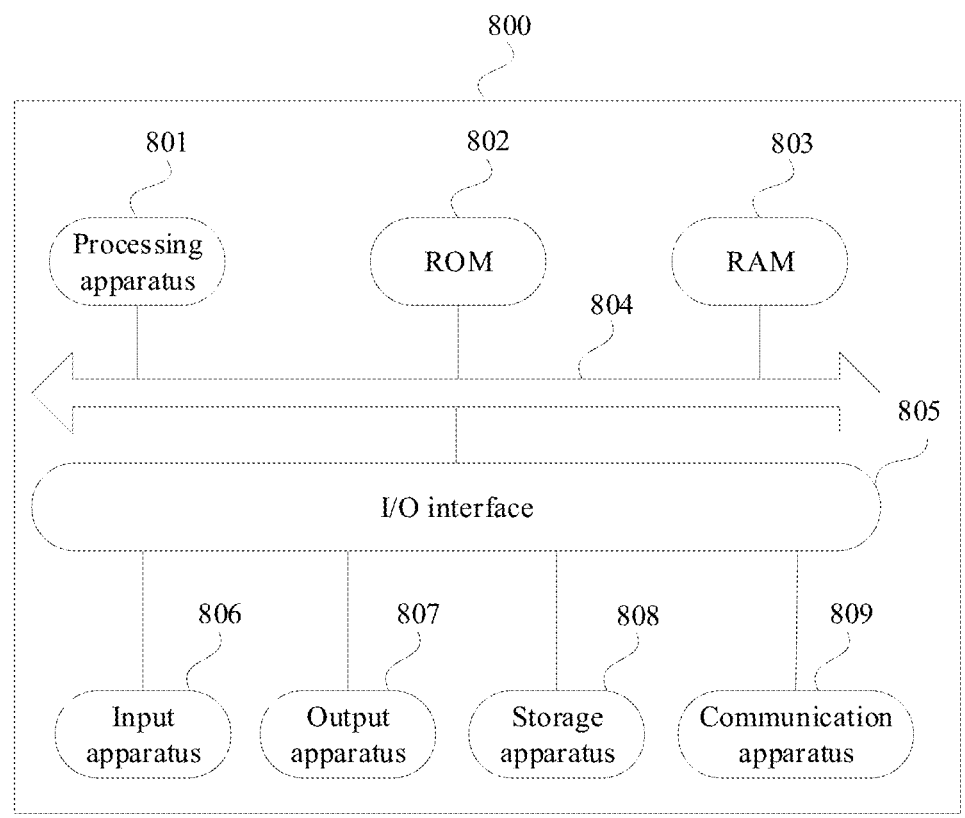
FIG. 8 is a structural schematic diagram of an electronic device provided by an embodiment of the present disclosure.

FIG. 8 is specifically referred below, and it shows the structure schematic diagram suitable for achieving the electronic device 800 (for example, the terminal device) in the embodiment of the present disclosure. The terminal device in the embodiment of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device shown in FIG. 8 is only an example and should not impose any limitations on the functions and use scopes of the embodiments of the present disclosure.

As shown in FIG. 8, the electronic device 800 may include a processing apparatus (such as a central processing unit, and a graphics processor) 801, it may execute various appropriate actions and processes according to a program stored in a read-only memory (ROM) 802 or a program loaded from a storage apparatus 808 to a random access memory (RAM) 803. In RAM 803, various programs and data required for operations of the electronic device 800 are also stored. The processing apparatus 801, ROM 802, and RAM 803 are connected to each other by a bus 804. An input/output (I/O) interface 805 is also connected to the bus 804.

Typically, the following apparatuses may be connected to the I/O interface 805: an input apparatus 806 such as a touch screen, a touchpad, a keyboard, a mouse, a camera, a microphone, an accelerometer, and a gyroscope; an output apparatus 807 such as a liquid crystal display (LCD), a loudspeaker, and a vibrator; a storage apparatus 808 such as a magnetic tape, and a hard disk drive; and a communication apparatus 809. The communication apparatus 809 may allow the electronic device 800 to wireless-communicate or wire-communicate with other devices so as to exchange data. Although FIG. 8 shows the electronic device 800 with various apparatuses, it should be understood that it is not required to implement or possess all the apparatuses shown. Alternatively, it may implement or possess the more or less apparatuses.

Specifically, according to the embodiment of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 809, or installed from the storage apparatus 808, or installed from ROM 802. When the computer program is executed by the processing apparatus 801, the above functions defined in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above-described computer readable medium may be included in the above-described electronic device; or may also exist alone without being assembled into the electronic device.

The above-described computer readable medium carries one or more programs, and when the one or more programs are executed by the electronic device, the electronic device is cause to: display a capture page, in response to a page display operation for the capture page, and display prompt information associated with a first media content on the capture page; wherein, the first media content is a media content having had a preset feedback operation executed by a user; the prompt information is used for displaying a target preview picture of a target effect; and the target effect is a capture effect adopted in the first media content; and adopt the target effect to capture a second media content, in response to a trigger operation of adopting the target effect for capture.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, Example 1 provides a media content capturing method, including: displaying a capture page, in response to a page display operation for the capture page, and displaying prompt information associated with a first media content on the capture page; wherein, the first media content is a media content having had a preset feedback operation executed by a user; the prompt information is used for displaying a target preview picture of a target effect; and the target effect is a capture effect adopted in the first media content; and adopting the target effect to capture a second media content, in response to a trigger operation of adopting the target effect for capture.

According to one or more embodiments of the present disclosure, Example 2 provides the method according to Example 1, wherein, the displaying prompt information associated with a first media content on the capture page, includes: displaying a prompt window on the capture page, and displaying media content information of the first media content and/or effect information of the target effect in the prompt window; or, displaying a prompt window on the capture page, and exhibiting the first media content in the prompt window.

According to one or more embodiments of the present disclosure, Example 3 provides the method according to Example 2, wherein, after the displaying prompt information associated with a first media content on the capture page, the method further includes: displaying a target preview picture of the target effect on the capture page, in response to an effect preview operation acting within the prompt window.

According to one or more embodiments of the present disclosure, Example 4 provides the method according to Example 1, wherein, the displaying prompt information associated with a first media content on the capture page, includes: displaying a target preview picture of the target effect on the capture page.

According to one or more embodiments of the present disclosure, Example 5 provides the method according to Example 4, wherein, after the displaying a target preview picture of the target effect on the capture page, the method further includes: canceling display of the target preview picture, in response to a preview cancel operation for the target effect.

According to one or more embodiments of the present disclosure, Example 6 provides the method according to Example 3 or 4, wherein, after the displaying a target preview picture of the target effect on the capture page, the method further includes: adding target background music in the first media content as background music, and/or switching display of a control name of an effect panel control on the capture page to display of an effect name of the target effect, the effect panel control being used for triggering display of an effect panel.

According to one or more embodiments of the present disclosure, Example 7 provides the method according to any one of Examples 1 to 5, wherein, after the displaying prompt information associated with a first media content on the capture page, the method further includes: switching the prompt information displayed on the capture page, in response to a switch operation, wherein, different prompt information is associated with different first media contents.

According to one or more embodiments of the present disclosure, Example 8 provides the method according to any one of Examples 1 to 5, wherein, the preset feedback operation includes a favorite addition operation; and the method further includes: adding the first media content to favorites in response to a favorite addition operation for the first media content, or, adding the first media content and the target effect to favorites.

According to one or more embodiments of the present disclosure, Example 9 provides a media content capturing apparatus, including: a page display module, configured to display a capture page, in response to a page display operation for the capture page, and display prompt information associated with a first media content on the capture page; wherein, the first media content is a media content having had a preset feedback operation executed by a user; the prompt information is used for displaying a target preview picture of a target effect; and the target effect is a capture effect adopted in the first media content; and a capturing module, configured to adopt the target effect to capture a second media content, in response to a trigger operation of adopting the target effect for capture.

According to one or more embodiments of the present disclosure, Example 10 provides an electronic device, including: one or more processors; a memory, configured to store one or more programs, wherein, the one or more programs, when executed by the one or more processors, cause the one or more processors to implement the media content capturing method according to any one of Examples 1 to 8.

According to one or more embodiments of the present disclosure, Example 11 provides a computer readable storage medium, having a computer program stored thereon, wherein, the program, when executed by a processor, implements the media content capturing method according to any one of Examples 1 to 8.

According to one or more embodiments of the present disclosure. Example 12 provides a computer program product, wherein, the computer program product, when executed by a computer, causes the computer to implement the media content capturing method according to any one of Examples 1 to 8.

The invention claimed is:

1. A media content capturing method, comprising:
    displaying a capture interface, in response to a display operation for the capture interface, and displaying prompt information associated with one of first media contents and a switch control on the capture interface; wherein the switch control is configured to be triggered to switch the prompt information associated with the one of the first media contents displayed on the capture interface into prompt information associated with another one of the first media contents, the first media contents are media contents on which a preset operation executed by a user has been performed; the prompt information associated with the one of the first media contents is used for displaying a target preview picture corresponding to a target effect; and the target effect is an effect adopted in the one of the first media content; and
    capturing a second media content and applying the target effect to the second media content, in response to a trigger operation.

2. The method according to claim 1, wherein displaying prompt information associated with the one of the first media contents on the capture interface comprises:
    displaying a prompt window on the capture interface, and displaying at least one of media content information of the one of the first media contents and effect information of the target effect in the prompt window; or,
    displaying a prompt window on the capture interface, and exhibiting the one of the first media contents in the prompt window.

3. The method according to claim 2, wherein after displaying prompt information associated with the one of the first media contents on the capture interface, the method further comprises:
    displaying a target preview picture corresponding to the target effect on the capture interface, in response to an effect preview operation acting within the prompt window.

4. The method according to claim 3, further comprising:
    during displaying the target preview picture corresponding to the target effect on the capture interface, executing at least one of: adding target background music of the one of the first media content as background music of the target preview picture; or switching a control name of an effect panel control displayed on the capture interface to an effect name of the target effect and displaying the effect name of the target effect on the capture interface, wherein the effect panel control is used for triggering display of an effect panel.

5. The method according to claim 1, wherein displaying prompt information associated with the one of the first media contents on the capture interface comprises:
    displaying the target preview picture corresponding to the target effect on the capture interface.

6. The method according to claim 5, wherein after the displaying the target preview picture corresponding to the target effect on the capture interface, the method further comprises:
    canceling display of the target preview picture, in response to a preview cancel operation for the target effect.

7. The method according to claim 1, wherein after displaying prompt information associated with the one of the first media content on the capture interface, the method further comprises:
    switching the prompt information associated with one of the first media contents displayed on the capture interface, in response to a switch operation; wherein different prompt information is associated with different first media contents.

8. The method according to claim 1, wherein the preset operation comprises a favorite addition operation; and the method further comprises:
    adding the one of the first media content to a favorites list in response to the favorite addition operation for the one of the first media content, or, adding the one of the first media contents and the target effect to the favorites list, in response to the favorite addition operation for the one of the first media contents.

9. An electronic device, comprising:
    at least one processor; and
    a memory, in communicative connection with the at least one processor; wherein, the memory stores a computer program executable by the at least one processor; the computer program is executed by the at least one processor, so that the at least one processor is capable of executing a media content capturing method, which comprises:
    displaying a capture interface, in response to a display operation for the capture interface, and displaying prompt information associated with one of first media contents and a switch control on the capture interface; wherein the switch control is configured to be triggered to switch the prompt information associated with the one of the first media contents displayed on the capture interface into prompt information associated with another one of the first media contents, the first media contents are media contents on which a preset operation executed by a user has been performed; the prompt information associated with the one of the first media contents is used for displaying a target preview picture corresponding to a target effect; and the target effect is an effect adopted in the one of the first media contents; and
    capturing a second media content and applying the target effect to the second media content, in response to a trigger operation.

10. The electronic device according to claim 9, wherein displaying prompt information associated with the one of the first media contents on the capture interface, comprises:
    displaying a prompt window on the capture interface, and displaying at least one of media content information of the one of the first media contents and effect information of the target effect in the prompt window; or,
    displaying a prompt window on the capture interface, and exhibiting the one of the first media content in the prompt window.

11. The electronic device according to claim 10, wherein after displaying prompt information associated with the one of the first media contents on the capture interface, the method further comprises:

displaying a target preview picture corresponding to the target effect on the capture interface, in response to an effect preview operation acting within the prompt window.

12. The electronic device according to claim 9, wherein displaying prompt information associated with the one of the first media contents on the capture interface comprises:
   displaying the target preview picture corresponding to the target effect on the capture interface.

13. The electronic device according to claim 12, wherein after the displaying the target preview picture corresponding to the target effect on the capture interface, the method further comprises:
   canceling display of the target preview picture, in response to a preview cancel operation for the target effect.

14. The electronic device according to claim 12, further comprising:
   during displaying the target preview picture corresponding to the target effect on the capture interface, executing at least one of: adding target background music of the one of the first media content as background music of the target preview picture; or switching a control name of an effect panel control displayed on the capture interface to an effect name of the target effect and displaying the effect name of the target effect on the capture interface, wherein the effect panel control is used for triggering display of an effect panel.

15. The electronic device according to claim 9, wherein after the displaying prompt information associated with the one of the first media contents on the capture interface, the method further comprises:
   switching the prompt information associated with the one of the first media contents displayed on the capture interface, in response to a switch operation; wherein different prompt information is associated with different first media contents.

16. The electronic device according to claim 9, wherein preset operation comprises a favorite addition operation; and the method further comprises:
   adding the one of the first media contents to a favorites list in response to the favorite addition operation for the one of the first media contents, or, adding the one of the first media contents and the target effect to the favorites list, in response to the favorite addition operation for the one of the first media contents.

17. A non-transient computer readable storage medium, having computer instructions stored thereon, wherein, the computer instructions, when executed by a processor, implement a media content capturing method, which comprises:
   displaying a capture interface, in response to a display operation for the capture interface, and displaying prompt information associated with one of first media content and a switch control on the capture interface; wherein the switch control is configured to be triggered to switch the prompt information associated with the one of the first media contents displayed on the capture interface into prompt information associated with another one of the first media contents, the first media contents are media contents on which a preset operation executed by a user has been performed; the prompt information associated with the one of the first media contents is used for displaying a target preview picture corresponding to a target effect; and the target effect is an effect adopted in the one of the first media contents; and
   capturing a second media content and applying the target effect to the second media content, in response to a trigger operation.

18. The non-transient computer readable storage medium according to claim 17, wherein displaying prompt information associated with the one of the first media content on the capture interface comprises:
   displaying a prompt window on the capture interface, and displaying at least one of media content information of the one of the first media contents and effect information of the target effect in the prompt window; or,
   displaying a prompt window on the capture interface, and exhibiting the one of the first media contents in the prompt window.

19. The non-transient computer readable storage medium according to claim 18, wherein after displaying prompt information associated with the one of the first media content on the capture interface, the method further comprises:
   displaying a target preview picture corresponding to the target effect on the capture interface, in response to an effect preview operation acting within the prompt window.

20. The non-transient computer readable storage medium according to claim 17, wherein displaying prompt information associated with the one of the first media contents on the capture interface comprises:
   displaying the target preview picture corresponding to the target effect on the capture interface.

* * * * *